May 5, 1936.                G. W. SWIFT, JR                2,039,750
                        CORRUGATED PAPERBOARD MACHINE
                        Filed April 20, 1934        8 Sheets-Sheet 1

INVENTOR
George W. Swift Jr.
by Knight Bros
ATTORNEYS

May 5, 1936. G. W. SWIFT, JR 2,039,750
CORRUGATED PAPERBOARD MACHINE
Filed April 20, 1934    8 Sheets-Sheet 8

INVENTOR
George W. Swift, Jr.

by Knight Bro
ATTORNEYS

Patented May 5, 1936

2,039,750

UNITED STATES PATENT OFFICE 2,039,750

CORRUGATED PAPERBOARD MACHINE

George W. Swift, Jr., Bordentown, N. J., assignor to George W. Swift, Jr., Inc., Bordentown, N. J., a corporation of New Jersey Application April 20, 1934, Serial No. 721,528

33 Claims. (Cl. 154—30)

This invention relates more especially to that type of corrugated paper board machine in which liner or facing webs are continuously applied to opposite faces of a corrugated web which is being formed continuously in the same machine. The general purpose of my invention is to provide an improved construction, combination and arrangement of parts in a machine of this character whereby the functioning of the several mechanisms which make up a machine for making substantially inflexible composite or double-faced corrugated boards, may be coordinated with greater accuracy; whereby the operations performed upon a plurality of webs separately and in aggregation, may be correlated with a higher degree of refinement; whereby two continuously running cutter mechanisms may be operated with the same or different periodicities in the cutting operations upon the laterally parted sections of a continuous substantially inflexible or double-faced corrugated web which is fed thereto past suitable slitting mechanism; whereby the timing of the continuously running cutters may be simply and accurately controlled with respect to each other and with respect to the feeding mechanism for the substantially inflexible web and other mechanisms which control the tension in the separate webs; whereby accurately dimensioned corrugated boards of uniformly high quality and substantially free from curling or warping may be secured; and whereby the foregoing objectives may be attained while the machine is in operation and under the guidance of the condition in which the finished product leaves the machine. According to the embodiment shown on the drawings, my invention contemplates improved means for maintaining a continuous web under substantially uniform conditions of temperature, moisture and tension while it is being fed to suitable web-corrugating mechanism for rendering the corrugations uniform in size and arrangement; improved means for applying the facing or liner webs to opposite faces of the corrugated web under substantially the same conditions of temperature and tension; means of improved construction for maintaining both liner webs under substantially the same uniform tension while they are being applied to the corrugated web; means of improved construction for maintaining the double-faced corrugated web perfectly flat and for preventing relative movements between the constituent webs throughout the period during which the adhesive which unites them is being dried and hardened; and means of improved construction for more accurately timing the sequence of operations while at the same time regulating the transmission of power to continuously running mechanisms for constructing a continuous web of double-faced corrugated paper board; for feeding it to the cutter mechanism and for correlating the variable functions of these mechanisms while they are running for producing the best results.

Particular purposes and constructional features contemplated by my invention will be understood from the specification and recited in the appended claims, reference being had to the accompanying drawings which illustrate an adaptation of the underlying principles of my invention to a machine for making double-faced corrugated paper boards of predetermined lengths and breadths.

Figure 1:
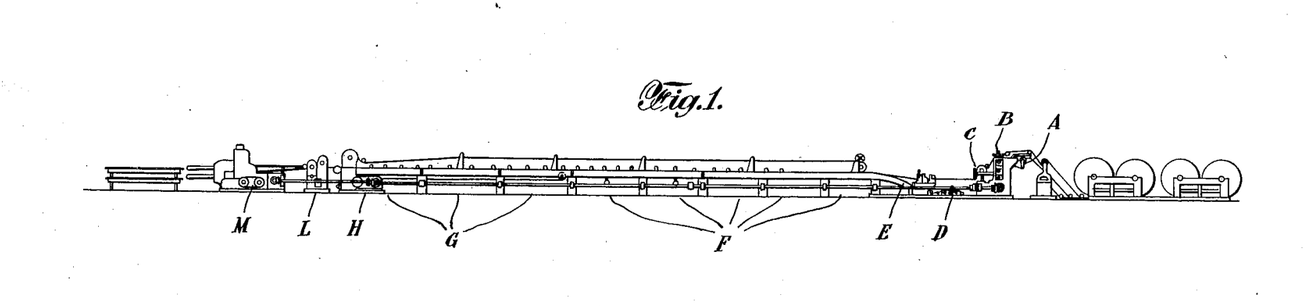
Figure 1 is a side elevation on a greatly reduced scale of a complete corrugated paper board machine constructed in accordance with the principles of the present invention.
Figure 2:
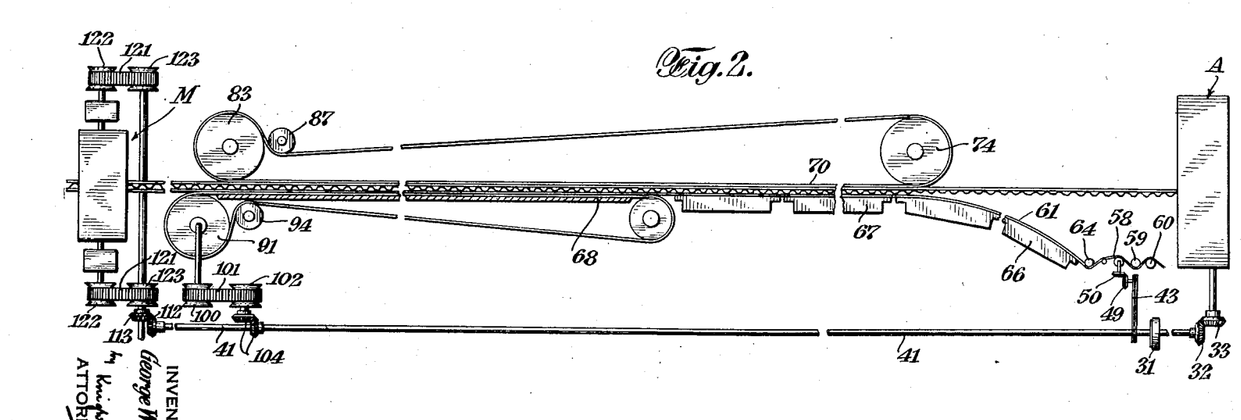
Figure 2 is a schematic diagram of the variable power-transmitting connections for certain of the cooperatively driven mechanisms embodied in the machine.

As shown in Figure 1 of the drawings, the present invention relates in a general way to mechanism A for unwinding an intermediate continuous web from a mill roll for supplying said web to web-corrugating rolls B under substantially constant tension which is distributed uniformly across the width of the web. A device C is arranged to vary the tension of an upper liner web coming from a suitable mill roll to be applied to the corrugated intermediate web as it leaves the web-corrugating rolls B. A bottom liner web is operated upon by mechanism D for unwinding it from a mill roll and permits the bottom liner web to be fed under substantially constant tension over an arcuate preheating table E interpositioned to be applied to the single-faced corrugated web. The double-faced corrugated web is then passed over a series of heater sections F under an upper endless frictional feed belt to a series of cooling table sections G over which the double-faced corrugated web is carried by a lower endless frictional feed belt. The upper and lower frictional feed belts are driven through variable speed power-transmitting mechanism H for feeding the double-faced corrugated web past mechanism L for longitudinally slitting the double-faced corrugated web during its passage to the duplex cutter mechanism M, both sections of which are driven through variable speed power-transmitting connections.

Figure 3:
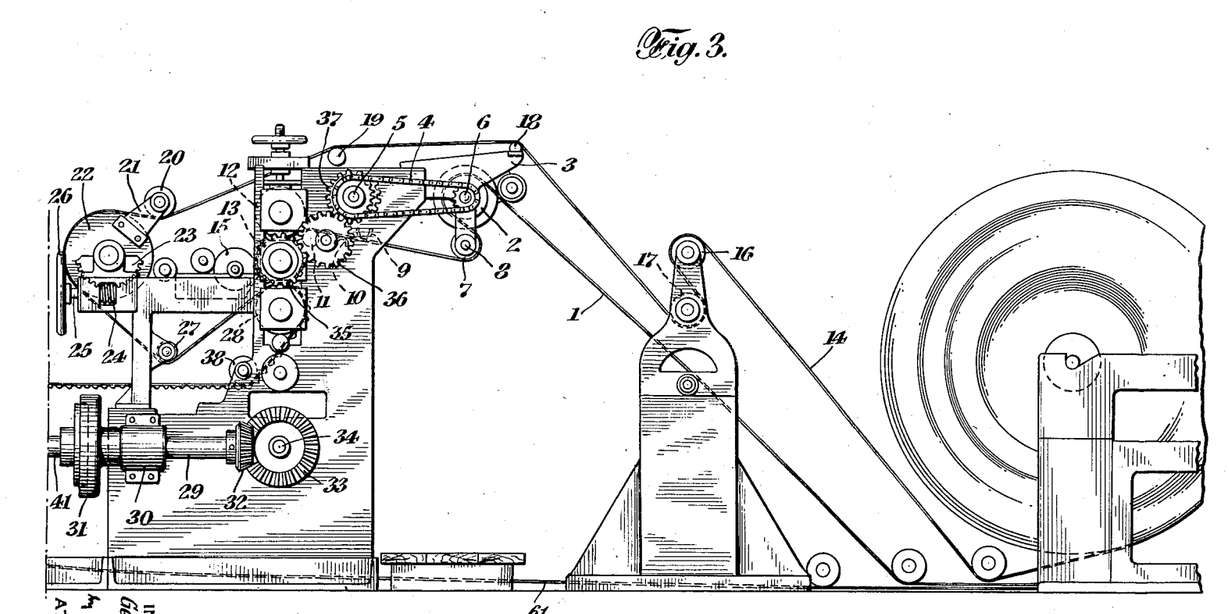
Figure 3 is an enlarged side elevation of the rearmost unit of the machine including the automatically controlled mechanism for unwinding mill rolls covered by my copending application Serial No. 714,943 which was filed in the U. S. Patent Office under date of March 10, 1934, said mechanism being applied to the middle web for controlling the amount and distribution of tension in said web as it enters between the corrugating rolls; and a device for regulating the tension of the top liner web.
Figure 4:
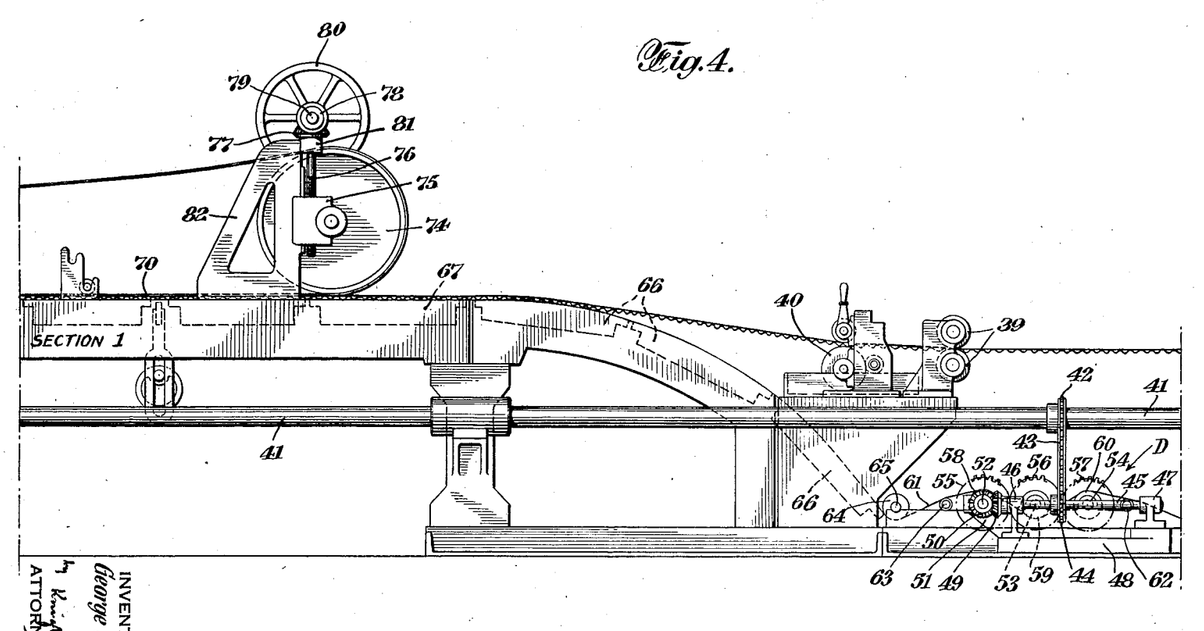
Figure 4 is an enlarged side elevation of the section next in advance of the machine unit shown in Figure 3, including the automatically controlled mechanism for unwinding mill rolls covered by my copending application Serial No. 716,499, which was filed in the U. S. Patent Office under date of March 20, 1934, said mechanism being applied to the bottom liner web for unwinding it from a mill roll and supplying it under substantially constant tension over the bottom liner web preheater to the single-faced corrugated web as it moves on to section I of the elongated main heater table.

As shown in Figure 3 of the drawings, an intermediate continuous web 1 is drawn from a mill roll by means of a roll 2 journaled in laterally-spaced brackets 3 and driven at slight overspeed by an endless sprocket chain 4 which connects a power shaft 5 to the shaft 6 which carries the roll 2. The continuous web 1 passes over and part-way around the roll 2 and downwardly and around a guide roller 7 which is freely rotatable about a tiltable axis 8, the tilt of said axis being capable of regulation for the purpose of uniformly distributing the tension across the width of the web 1 in the manner shown, described, and claimed in my above-identified copending application Serial No. 716,499. The continuous web 1 as it leaves the guide roller 7 passes an upper steam spraying device 9 and a lower steam spraying device 10 immediately prior to its passage over a guide roller 11 and entrance between an upper corrugating roll 12 and a lower corrugating roll 13 under substantially constant tension which is distributed uniformly across the width of the web. As the corrugated web moves rearwardly past the common axial plane of the corrugating rolls 12 and 13, an upper liner web 14 is applied thereto, a suitable adhesive having been applied to the tips of the corrugated web by a fountain roll 15. The upper liner web 14 passes upwardly over a guide roller 16 and under a second guide roller 17 to an ironing bar 18 from whence it passes over a second bar 19 to a tensioning roll 20. The tensioning roll 20 is journaled in laterally spaced brackets 21 mounted on the end faces of a web-feeding drum 22, said web-feeding drum being provided with a gear segment 23 into which meshes a worm 24 keyed to a shaft 25 which is provided with a hand wheel 26. It will be understood from this description that by turning the hand wheel 26, the axially spaced brackets 21 will be moved angularly about the axis of the drum 22 in such a way as to vary the drag imposed upon the upper liner web 14 by the guide roller 20 in different angular positions about the axis of drum 22. After leaving the drum 22, the liner web 14 passes about a guide roller 27 upwardly and over a pressure roll 28 by which it is applied continuously to the corrugated web 1 to form a continuous single-faced corrugated web. A short power shaft section 29 which is journaled in a bearing bracket 30 on an adjacent side frame, may be connected up with or disconnected from an elongated power shaft to be hereinafter referred to by means of a clutch 31, said elongated power shaft being constructed and arranged to supply power in common to variably driven web-feeding mechanism and the variably driven units of a duplex cutter mechanism which is to be hereinafter described. The shaft section 29 carries a bevel pinion 32 which is keyed thereto and meshes with a bevel gear 33 which is keyed to a cross shaft 34. The cross shaft 34 is connected by suitable gears to the shaft which carries the pressure roll 28 which is in turn geared to the corrugating rolls 12 and 13. The lower corrugating shaft carries a spur gear 35 which meshes with an idler 36, said idler being in mesh with a spur gear 37 which is keyed to the power shaft 5 for driving the mill-roll unwinding roll 2 which has a peripheral speed slightly in excess of the desired substantially constant speed at which the intermediate web is to be supplied to the corrugating rolls 12 and 13. Referring now to Figures 3 and 4 of the drawings, as the single-faced corrugated web passes from and around a guide roller 38, it passes between sizing rolls 39 and over a fountain roll 40 for applying silicate or other adhesive to the downwardly presented tips of the single-faced corrugated web in preparation for the application thereto of the bottom liner web. The bottom liner web is unwound from a suitable mill roll and supplied under substantially constant tension to the single-faced corrugated web by means of mill roll unwinding mechanism D such as that shown and described in my copending application Serial No. 716,499 referred to above. As shown on the drawings, there is a longitudinal power shaft 41 which constitutes a source of power common to the parts A, B, D, H, L, and M of the machine. This power shaft 41 is provided with a sprocket wheel 42 which is connected by a sprocket chain 43 to a sprocket wheel 44 on a counter shaft 45, said counter shaft being journaled in suitable bearings 46 and 47 mounted on a laterally projecting portion 48 of one of the side frames of the machine. Keyed to the forward end of the counter shaft 45 is a bevel pinion 49 which meshes with a second bevel pinion 50 journaled in a bearing bracket 51. The bevel pinion 50 is splined upon a projecting end of a live cross shaft 52 which is parallel to and rotates in unison with two other live cross shafts 53 and 54. For this purpose, the shafts 52, 53 and 54 carry intermeshing spur gears 55, 56 and 57 which are keyed to said shafts respectively. Rigidly connected to and rotatable with said shafts 52, 53 and 54 respectively, are spaced power-driven web-feeding rolls 58, 59 and 60, which are thus journaled upon parallel axes arranged in a common plane. As shown in Figure 4 of the drawings, a bottom liner web 61 coming from a mill roll (not shown), passes over a guide bar 62 and from thence over and part-way around the web-feeding roll 60 which rotates in a counter-clockwise direction. From the roll 60, said web passes downwardly, under and part-way around the web-feeding roll 59 which rotates in a clockwise direction, and from thence upwardly over and part-way around the web-feeding roll 58 which rotates in a counter-clockwise direction, after which said web slides over a cross bar 63. From the cross bar 63, the liner web passes under a guide roller 64 which is freely journaled upon a stay shaft 65. According to the present embodiment of my invention, the continuous web next passes upwardly over a series of arcuate heating units 66 of a curved heating table by means of which the liner web is preliminarily heated preparatory to being applied to the single-faced corrugated web.

The driving connections described above are suitably designed for rotating the web-feeding rolls 58, 59 and 60 with a peripheral speed slightly in excess of the velocity of the liner web as it moves over the preheating table. Under these conditions, any tendency in the web to be drawn under greater tension than the desired substantially constant tension referred to above, operates to draw the web into sufficient frictional engagement with the web-feeding rolls 58, 59 and 60 to enable them to draw on the mill roll for an additional supply of the continuous web. This operation takes place automatically under the control of the tension in the web without an undesirable variation in the amount of tension in the liner web as it is being delivered to the single-faced corrugated web. As the assembled corrugated and liner webs which go to make up the completed continuous double-faced corrugated web moves forwardly through a prolonged drying operation, it is substantially inflexibly supported from above and below for maintaining it perfectly flat until the webs and the adhesive which unites them becomes completely dried and the latter completely cured. During the drying treatment, moreover, the relative tensioning of the top and bottom liner webs may be regulated at will while the machine is running for the purpose of equalizing the tension in said webs and preventing the displacement of one web on another in such a way as to injure the adhesive bond therebetween.

Figure 5:
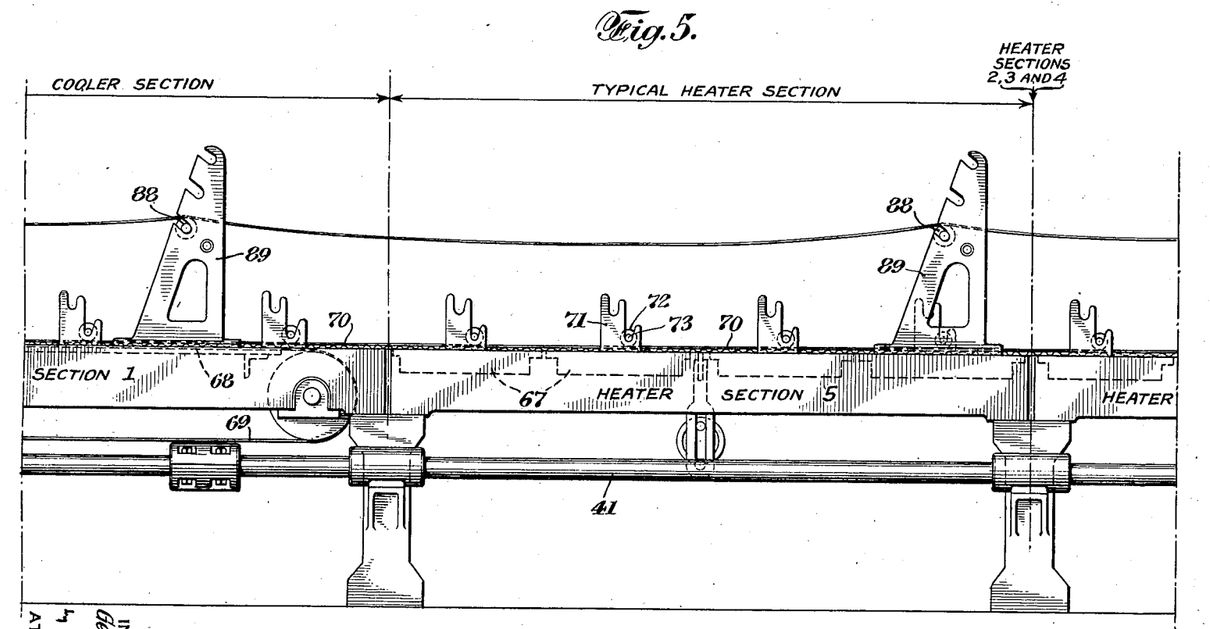
Figure 5 is an enlarged side elevation of the forward end of heater section I; heater section 5; and rear end of cooling section I; heater sections 2, 3, and 4, which are substantially similar to heater section 1, being omitted to save space.

As shown in Figures 4 and 5 of the drawings, the five heater sections comprise a series of heater plates 67 having their upper surfaces arranged in a common plane to provide a substantially continuous flat support for the double-faced corrugated web to slide over during the drying of the webs and adhesive and the curing of the latter.

Figure 6:
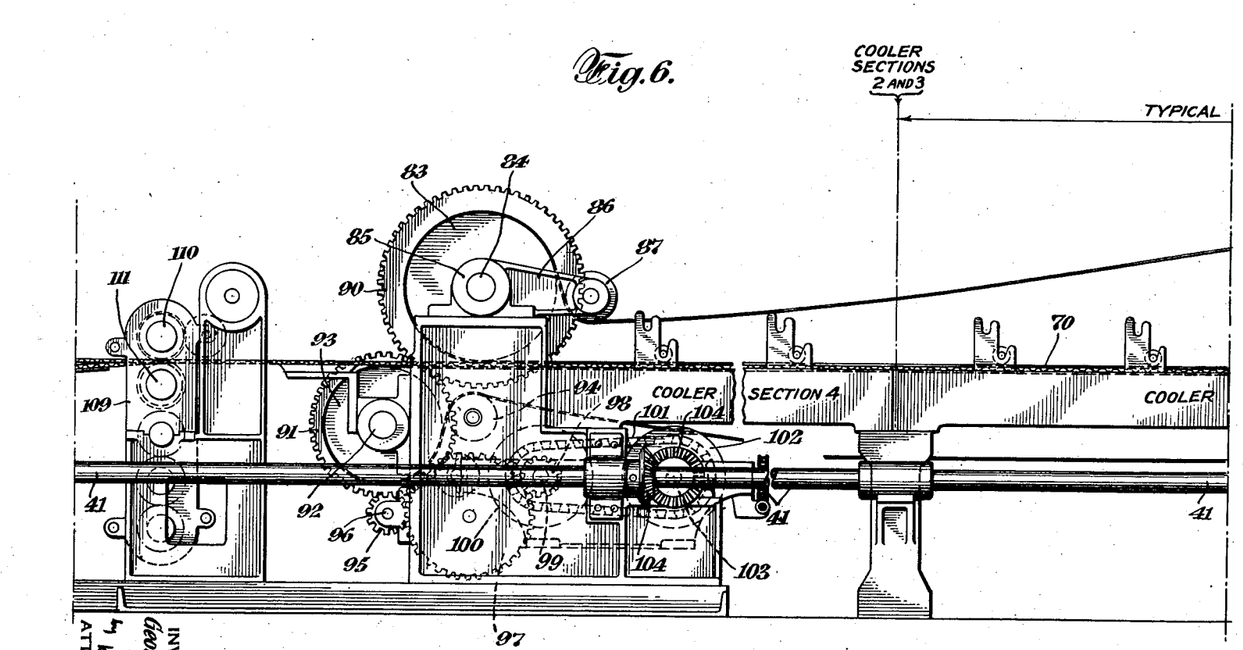
Figure 6 is an enlarged side elevation of the forward end of cooler section 1; cooler section 4; variable speed power-transmitting connections for the upper and lower frictional feed belts; and longitudinal slitting mechanism; cooler sections 2 and 3 which are substantially similar to cooler section 1 being omitted to save space.
Figure 8:
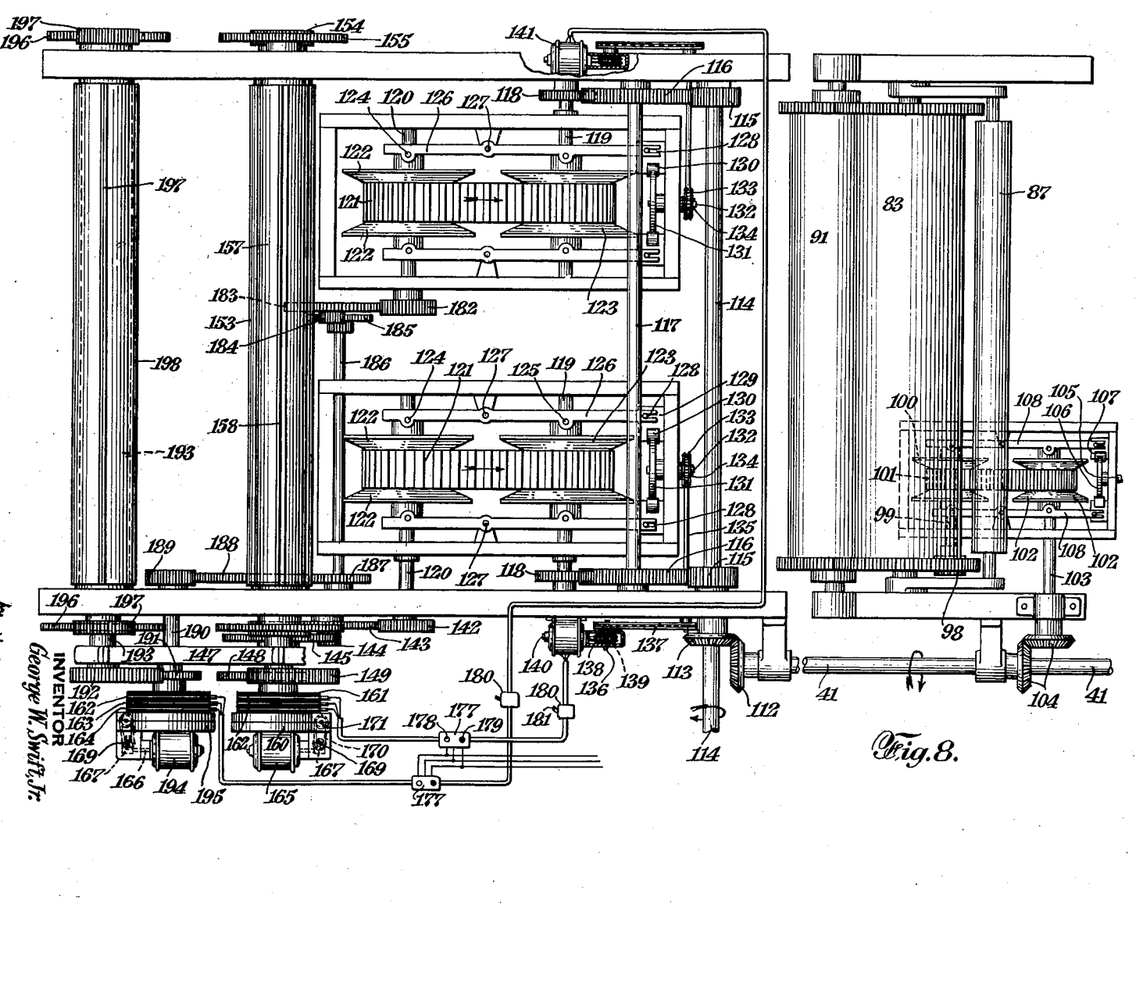
Figure 8 is a top plan view of the duplex cutter mechanism shown in Figure 7, and of a fragmentary portion of the variable speed power connections for the frictional feed belts, the longitudinal slitter being omitted.

As shown in Figures 5 and 6 of the drawings, the four cooler sections are provided with a continuous top plate 68 which extends with an unbroken surface forwardly from the foremost heater plate 67 and at a suitable level to support the forwardly moving upper run of a lower endless frictional feed belt 69 with its upper surface arranged in a common plane of the upper surfaces of the heater plates 67. The lower endless feed belt 69 is thus constructed and arranged to form, in effect, a conveyor belt for the continuous double-faced corrugated web as well as to operate thereon as a frictional web-feeding means. As shown in Figures 4, 5, and 6 of the drawings, an upper endless frictional feed belt 70 has its forwardly moving lower run resting upon the top surface of the double-faced corrugated web for approximately the entire distance between the rearmost heater plate 67 and the front edge of the cooler plate 68. The forward end of the lower run of the upper frictional feed belt is thus arranged to cooperate with the upper run of the lower frictional feed belt for imparting the forward drive to the double-faced corrugated web, and for this purpose said frictional feed belts are driven at the same velocities, the common velocities of these belts being slightly in excess of the desired velocities at which the double-faced corrugated board is, to be delivered to the duplex cutter mechanism to be hereinafter described. Mounted on the oppositely arranged side frames of the machine and at longitudinally spaced intervals, are pairs of laterally spaced brackets 71, each of said brackets being provided with a recess 72 for journaling a pressure roll 73 which operates as a rotary weight upon the lower run of the upper frictional feed belt 70 for maintaining said feed belt in close engagement with the top surface of the double-faced corrugated web. The rear end of the upper endless frictional feed belt 70 runs over a follower drum 74 which is journaled in laterally spaced bearings 75 which are adjustable vertically by means of a threaded shaft 76 which carries at its upper end a bevel pinion 77. Meshing with the bevel pinion 77 is a second bevel pinion 78 keyed to a transverse shaft 79 which may be provided on either end with a hand wheel 80 whereby the elevation of the drum 74 may be suitably adjusted. The vertical shafts 76 are journaled in laterally spaced bearings 81 which are carried by suitable laterally spaced brackets 82. The forward end of the upper frictional feed belt passes over and is driven by a rotary drum 83 which is provided with a cross shaft 84 journaled in laterally spaced bearings 85 mounted on the opposite side frames of the machine. Laterally spaced slack take up arms 86 are oscillatably mounted upon the cross shaft 84 and carry between their outer ends a freely rotatable drum 87 which presses downwardly upon the upper run of the upper frictional feed belt. As shown in Figure 5, the return run of the upper frictional feed belt may be movably supported by a series of freely journaled guide rollers 88 mounted in laterally spaced brackets 89 mounted on the opposite side frames of the machine. Keyed to the cross shaft 84 of the drum 83 are axially spaced spur gears 90 which mesh with and are driven by correspondingly arranged lower spur gears 91 which are keyed to a cross shaft 92. The cross shaft 92 carries a drum 93 for driving the lower frictional feed belt at its forward end, the return run of this feed belt being drawn into close contact with the drum 93 by a guide roller 94. Meshing with one of the axially spaced spur gears 91 is a spur pinion 95 which, as shown in Figures 6 and 8 of the drawings, is mounted on a cross shaft 96 and meshes with an idler gear 97. Said idler 97 is in mesh with and driven by a spur pinion 98 keyed to the outer end of the power delivery shaft 99 of a variable speed power-transmitting mechanism. The shaft 99 is driven by axially spaced cones 100 through an endless belt 101 which connects it with the axially spaced cones 102 on a power-intake shaft 103. The outer end of the intake shaft 103 is connected by bevel gears 104 to the common elongated power shaft 41. The power-transmitting ratio of this variable speed device may be regulated at will through a shaft 105 to which is keyed a cam 106 operating upon laterally spaced cam rolls 107 in the oppositely arranged ends of two pivotally mounted levers 108. It will be understood from this description that a rotary movement imparted to the control shaft 105 may be employed for simultaneously reducing or increasing the velocities of the upper and lower frictional feed belts with respect to the common drive shaft 41. It will be understood, therefore, that by changing the speed of the frictional feed belts, the pull exerted thereby upon the top and bottom liner sheets may be varied at will for the purpose of overcoming any inequalities in the several webs which would otherwise tend to produce a warping or curling of the double-faced corrugated boards issuing from the duplex cutter mechanism to be presently referred to. As shown in Figure 6 of the drawings, the completed double-faced corrugated board passes forwardly to a slitting machine 109, said slitting machine being provided with upper and lower slitter disks rotatable about horizontal axes 110 and 111 for longitudinally parting the continuous double-faced corrugated board as it passes the common plane of said axes.

Figure 7:
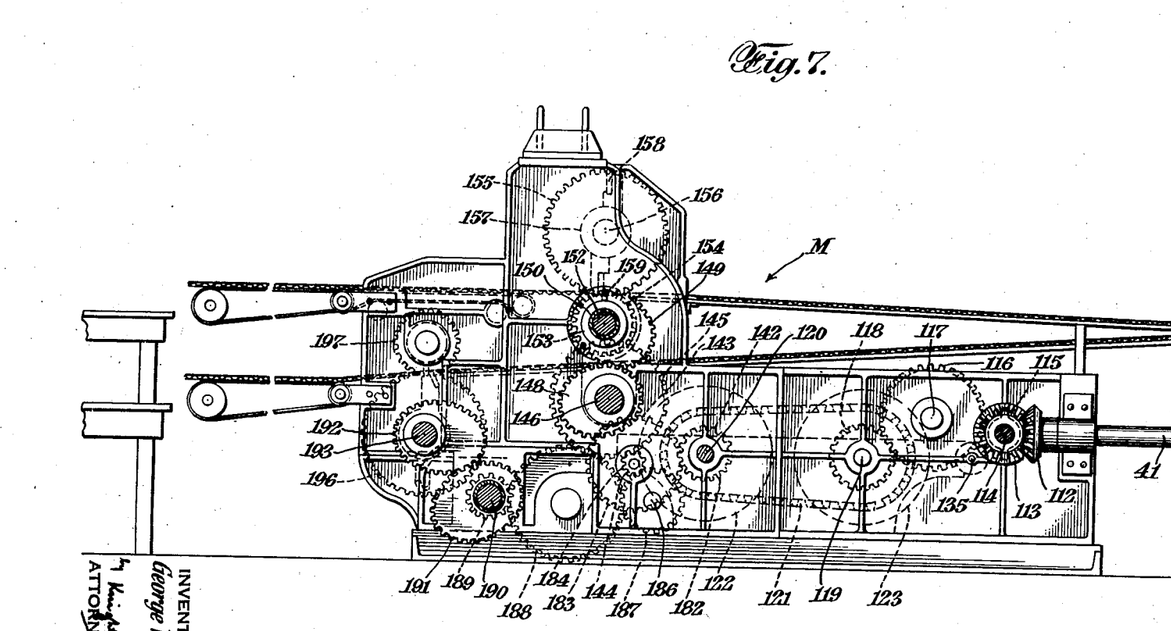
Figure 7 is an enlarged side elevation of a duplex cutter mechanism, each unit of said cutter mechanism being of substantially similar construction to that covered by U. S. Patent No. 1,951,536 for Variable drive mechanism, which was granted in my name on March 20, 1934.

Referring now to Figures 7 and 8 of the drawings, the duplex cutter mechanism and the variable speed power-transmitting mechanisms related thereto will now be described. As shown best in Figure 8 of the drawings, the forward end of the elongated power shaft 41 may be provided with a bevel pinion 112 which meshes with a second bevel pinion 113 on a cross shaft 114. Said cross shaft carries axially spaced spur pinions 115 which drive spur gears 116 on a transverse shaft 117, said spur gears 116 being arranged to mesh with spur gears 118 which are respectively keyed to the coaxially arranged power intake or constant speed shafts of two laterally spaced variable speed power transmission mechanisms for respectively driving two variable periodicity cutting mechanisms. Said cutting mechanisms are constructed and arranged in the manner to be hereinafter pointed out to operate on the laterally parted sections formed by longitudinally slitting the continuous web of double-faced corrugated board as it is being delivered by the upper and lower frictional feed belts. Due to the substantially rigid character of the continuous double-faced corrugated board, it is, of course, necessary to operate both pairs of continuously running cutter blades at the same cutting speed. On the other hand, in order to operate the machine with the highest possible efficiency, it is desirable to make the machine capable of cutting different uniform lengths from the laterally parted sections during one and the same run-off. For this purpose, variable speed power-transmitting mechanism is separately connected up with each pair of cutter blades so that while the cutter blades of each pair may come into operative position at the same speed, namely, that at which the continuous double-faced corrugated board is moving, the periodicities of the cutting operations may be made the same or different for both pairs of cutter blades. As pointed out in my co-pending application Serial No. 649,872 on Variable speed cutting mechanism which was filed in the U. S. Patent Office under date of January 3, 1933, it is furthermore desirable to have the cutter mechanisms arranged at different distances from their common line of divergence from a common plane of movement prior to the cutting operations and with the orbit of one cutter blade in each pair arranged between the divergent planes in which the different webs are moving. According to my present invention, the common line from which the cutting planes diverge is arranged in the common axial plane of the slitting cutters which part the continuous double-faced corrugated board into laterally parted sections. As shown in Figure 8 of the drawings, each spur gear 118 is keyed to the power intake or constant speed shaft 119 of one of the variable speed power-transmitting mechanisms. Said power intake shaft 119 may be connected to the variable speed power delivery shaft 120 of this variable speed mechanism by means of an endless belt 121 of V-shaped cross-section which operates between two pairs of axially adjustable cone disks 122 and 123, said cone disks being splined to the constant and variable speed shafts respectively. The cone disks on each of said shafts may be adjusted toward and away from each other in conjunction with a corresponding opposite relative adjustment of the cone disks on the other shaft for changing the velocity ratios at which power is transmitted. For this purpose, said cone disks are pivotally connected in pairs at 124 and 125 to oscillatory levers 126 which are pivotally mounted intermediately of their ends at 127. Connected to the rearwardly presented ends of the oscillatory levers 126 by means of pin and slot connections at 128 are oppositely arranged slides 129 which carry cam rollers 130. Interacting between said cam rollers is a double-lobed cam 131 which is keyed to a worm wheel shaft 132. Also keyed to shaft 132 is a worm wheel 133 which meshes with a worm 134 on a worm shaft 135. Said worm shaft 135 is connected to and driven from a short worm wheel shaft 136 by means of a sprocket chain 137, a worm wheel 138 which is keyed to shaft 136 being in mesh with and driven by a worm 139 which is keyed to the armature shaft 140 of a small motor 141 which is energized through electric circuits to be hereinafter described.

Figure 9:
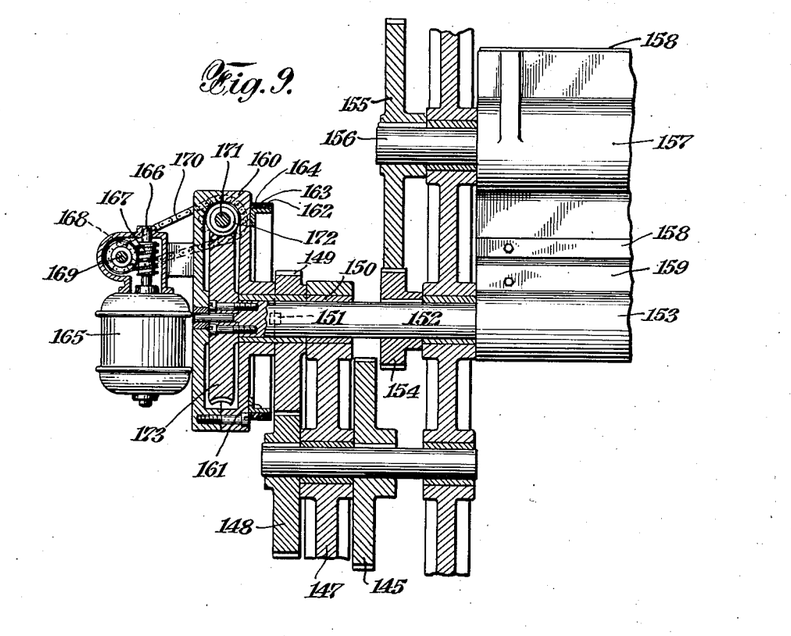
Figure 9 is an enlarged vertical cross-section of the differential connections for one pair of cutter blades, parts being shown in elevation.
Figure 10:
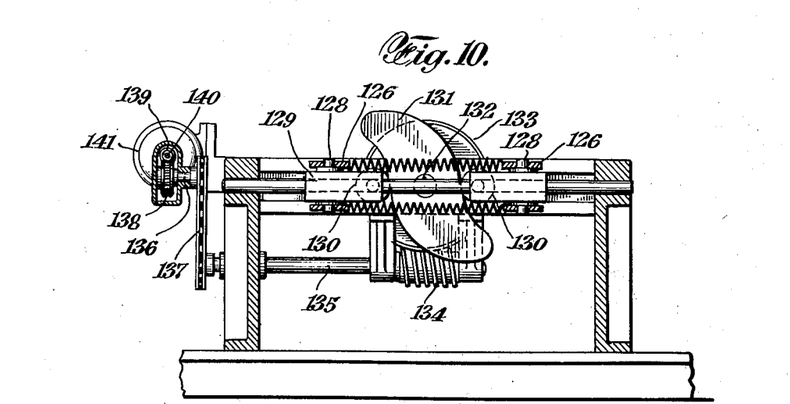
Figure 10 is an enlarged rear elevation of the adjustment mechanism for one of the variable speed drives, parts being shown in section.

Referring now to Figure 8 of the drawings, the variable speed power-transmission mechanism on the side adjacent to the common power shaft 41, is provided with a spur gear 142 which is keyed to the outer end of the power delivery shaft 120. Said spur gear 142 meshes with the larger spur gear 143 of a compound gear, the smaller spur gear 144 of said compound gear being in mesh with a large spur gear 145 which, as shown in Figure 7 of the drawings, is keyed to a short shaft 146 (journalled in an outrigger frame 147). Keyed to the shaft 146 on the outside of outrigger frame 147, is a lower elliptical gear 148 which meshes with an upper elliptical gear 149. As shown in Figure 9 of the drawings, the upper elliptical gear 149 is keyed to a sleeve 150 by means of a key 151, said sleeve 150 being freely journaled upon a lower cutter blade shaft 152 which carries a lower cutter blade drum 153

Keyed to the lower cutter blade shaft 152 are axially spaced spur gears 154 which mesh with larger spur gears 155 keyed to an upper cutter blade shaft 156. The shaft 156 carries an upper cutter blade drum 157, said drums 153 and 157 being provided with cutter blades 158 and 159 which are constructed and arranged to move into cutting opposition with respect to each other in the common plane of the axes of shafts 152 and 156. As shown best in Figure 9 of the drawings, a gear housing 160 is mounted on and revolvable with the sleeve 150. Mounted upon the gear housing 160 and presented inwardly therefrom is a circular flange 161 which is provided with a forward drive conductor ring 162, a rearward drive conductor ring 163, and a common ground conductor ring 164, said conductor rings being suitably connected up with a small motor 165 which is mounted upon the outer wall of the gear housing 160. The motor 165 is provided with an armature shaft 166 which carries a worm 167, said worm being in mesh with a small worm gear 168 keyed to a small shaft 169. The outer end of the shaft 169 is connected by a sprocket chain 170 to a worm shaft 171 which is journaled in the gear housing 160 and carries a worm 172 which meshes with a worm gear 173. The worm gear 173 is rigidly secured to the outer end of the lower cutter blade shaft 152 so that in the event that the elliptical gears 148 and 149 are held stationary while the small motor 165 is energized, the worm gear 173 will be rotated together with the lower cutter blade shaft 152 and result in an angular movement of the cutter blades 158 and 159 with respect to the elliptical gears 148 and 149. The effect of this adjustment will be to cause the cutter blades to come into opposition with each other under different gear ratios as shown and described in my above-identified copending application Serial No. 674,819. The small motor 141 which controls the setting of the speed ratio cones of the variable speed power transmission and the small motor 165 which controls the setting of the cutter blades are both preferably constructed to be reversibly driven and may be of the same size and power. These motors are furthermore preferably connected up in an energizing circuit such, for example, as that shown on Figure 8 of the drawings in which the circuit wires 174, 175 and 176 may be arranged to connect said motors with a common source of electricity through a control station 177 provided with push buttons 178 and 179 for forward or reverse drives together. By the inclusion of a switch box 180 provided with a circuit-making and circuit-breaking switch arm 181, in the operating circuit of either motor, the other motor may be separately driven. The operation of the variable speed cutting mechanism may be briefly described as follows. One or the other of the longitudinally parted sections of the continuous web of double-faced corrugated board being delivered at constant speed to the revolving cutter blades 158 and 159 for cutting boards of predetermined equal lengths from the traveling web, the motors 141 and 165 remain inactive, the latter motor, however, being revolved continuously about the axis of the lower cutter shaft during the periodic operations of the cutter blades. In the event that the cutting mechanism is to be set up for cutting boards of different length, the small motor 141 which controls the setting of the variable speed transmission, may be energized to rotate forwardly or in reverse by pressing one or the other of the push buttons 178 and 179 for changing the frequency of the recurring operations of the cutter blades 31 and 32. As the frequency of the cutter mechanism is changed, however, the cutting speed will be changed proportionately so that the cutter blades at opposition will be moving either faster or slower than the continuous supply of paper board unless some compensation in the cutting speed of the cutter blades is made in the manner described above. In a general way, with both motors connected up to the power supply, a depression of push button 178 produces a simultaneous forward rotation of both motors. As a result, the accelerated periodicity of the cutting operation shortens the length of the corrugated paper boards cut from the continuous web while at the same time the position of the cutter blades with respect to the elliptical gears is changed to make the cutting speed of said cutter blades synchronize more or less precisely with the movement of the web. If, by chance, the simultaneous adjustment of the two motors does not produce an exact synchronism in these movements, the motor 141 may be cut out of circuit by the switch arm 181 and refined adjustments of the cutter blades with respect to the elliptical gears 21 and 22 may then be made by pressing the other push button for advancing or retreating the cutter blades until exact synchronization is secured.

Referring again to Figure 8 of the drawings, a brief description of the second variable periodicity cutter mechanism will be sufficient by reason of similarity in construction and in the manner in which it is controlled. Thus, the projecting end of the power-delivery shaft 120 of the second variable speed power-transmitting mechanism carries a spur gear 182 which meshes with the larger spur gear 183 of a compound gear, the smaller gear 184 of said compound gear being in mesh with a spur gear 185 on the inner end of a transverse shaft 186. To the outer end of said shaft 186 is keyed a spur gear 187 which meshes with a large idler 188, said idler being in mesh with a smaller spur gear 189 on the inner end of a short shaft 190. Keyed to the outer end of shaft 190 as shown in Figure 7 of the drawings, is an elliptical gear 191 which meshes with a second elliptical gear 192. The elliptical gear 192 is keyed to a short tubular sleeve (not shown) which is freely journaled on and connected to a lower cutter blade shaft 193 by differential mechanism similar to that shown in Figure 9 of the drawings and in the manner described above in connection with the first pair of cutter blades. Said differential mechanism is controlled by a small motor 194 which is mounted on and revolves with the housing 195 for the differential gearing, said motor being connected up in an energizing circuit substantially similar to that already described in connection with the first pair of cutter blades. The lower cutter blade shaft 193 is provided with axially spaced spur gears 196 of relatively larger diameter which mesh respectively with spur gears 197 of smaller diameter which are keyed to an upper cutter blade shaft 198. Said lower and upper cutter blade shafts carry lower and upper cutter blades 199 and 200 which come into cutting opposition with respect to each other at recurring intervals of variable duration depending upon the setting of the variable speed power-transmitting mechanism corresponding thereto. For the purpose of controlling the periodicity of the cutting operation of the second pair of cutter blades 199 and 200 while at the same time maintaining a cutting speed equal to the velocity of the continuous corrugated web delivered thereto, the small motor 194 which controls the angular positioning of the cutter blades 199 and 200 with respect to elliptical gears 191 and 192 may be cooperatively related in the manner already described in connection with the first pair of cutter blades. The improved effects produced upon the finished substantially rigid composite or double-faced corrugated boards coming from a machine constructed as above described, will now be readily understood and briefly explained are as follows.

In its entirety, the present machine contemplates a series of interrelated operations some of which are carried on simultaneously on different webs and others of which are carried on sequentially on the assembled webs which go into the final product. As the middle web enters between the web-corrugating rolls, it is maintained under a substantially unvarying tension which is uniformly distributed across the width of the web while at the same time being subjected to moisture and heat in the form of steam sprays projected thereon simultaneously from opposite sides of the web. Under these conditions, the corrugations formed in the web are rendered uniform in size and arrangement. As the corrugated web leaves the corrugating rolls, the top liner web is supplied thereto under substantially uniform tension and drag which may be regulated in respect to the substantially uniform tension in the bottom liner sheet as well as in respect to the velocity under which the completed composite or double-faced corrugated board is delivered to the duplex cutter mechanism. At the same time, the bottom liner sheet is supplied to the single-faced corrugated web under substantially uniform tension which is automatically maintained the same as or substantially equal to the tension in the top liner web, said bottom liner web being passed over a preheating table of arcuate form as it approaches coincidence with the path of the single-faced corrugated web as it begins its straight-away travel during an extended interval during which all of the assembled webs are inflexibly confined to a given plane of movement under the action of upper and lower frictional feed belts. During the forward movement of the assembled webs they are held perfectly flat while the upper and lower feed belts which travel at the same speed slightly in excess of the velocity imparted thereby to the multiplex web, the top and bottom liner webs being subject to the same frictional pressure from above and below. As a result, the possibility of relative movement between the joined webs is practically eliminated while being inflexibly confined to a given plane of movement until the webs and the adhesive which unites them have become completely dried. Closely related to the foregoing conditions is the overfeed velocity of the frictional feed belts which by means of the variable speed power transmission mechanism may be regulated to a high degree of refinement or change in infinitesimal amounts for the purpose of correcting any tendency in the completed boards toward curling or warping. For this purpose, it is of peculiar importance to regulate the overspeed velocity of the frictional feed belts while the machine is running for the reason that infinitesimal changes in speed may be effected while observing the effects produced on the final product. As the completed composite or double-faced corrugated web passes the slitting mechanism by which it is parted to form different continuous sections, said sections which are practically inflexible are slightly flexed in opposite directions above and below the common plane of their origin and within certain limits within which they are not injured for delivering them simultaneously to different pairs of cutter blades which form the duplex cutter mechanism. For this purpose, each pair of cutter blades is preferably constructed with unequal radii and arranged at different distances from the line of intersection of the planes in which they operate so that by arranging each pair of cutter blades with the one having the smaller orbital diameter between the operating planes, the amount of flexing imparted to each section of the substantially inflexible web may be reduced to a minimum. For the production of composite boards from one section of the composite web of different uniform length from those produced from the other section of said composite web, the velocity at which the cutter blades of both pairs come into cutting opposition must be the same and equal to the velocity of said composite web. For this purpose, each pair of cutter blades is operated through the combined variable periodicity and differential mechanisms described above. For the purpose of coordinating, with a high degree of precision, the several variable speed power-transmitting mechanisms with respect to each other and in relation to the constant velocity drives for the web-corrugating and liner-feeding mechanisms, the present invention contemplates preferably the provision of an elongated power shaft which is common to all of said mechanisms and the direct separate connection of each of said mechanisms to said common power shaft. By means of this construction and arrangement, the effects of variations in each variably driven mechanism can be separately observed while the machine is running and regulated in respect to a constant velocity shaft which is common to all.

I claim:—

1. In a machine of the character described, the combination with means for applying liner webs to the oppositely presented silicated tips of a corrugated web, of means for conveying the double-faced corrugated board through successive heating and cooling stages of a drying operation, said conveying means being constructed and arranged to constrain the movement of said double-faced corrugated board to one and the same plane under substantially uniformly distributed pressure throughout the duration of the drying operation, means for feeding the double-faced corrugated board to said conveying means at substantially constant velocity, and operating connections for varying the velocity of said conveying means while the machine is running.

2. In a machine of the character described, the combination with means for drying a plurality of continuous webs connected together by adhesive, of means for movably supporting the attached continuous webs in a given plane in which they are moved past said drying means, said supporting means including a lower endless belt having its upper run moving forwardly in substantially said given plane, means arranged below and slidably supporting the upper run of said endless belt against downward deviation from said given plane, and an upper endless belt having a forwardly moving portion in frictional engagement with the connected continuous webs, and means for varying the velocity of said upper endless belt while in motion.

3. In a machine of the character described, the combination with a series of heater plates constructed and arranged to provide a substantially continuous flat support, a lower endless belt having its upper run moving forwardly away from said heater plates, an inflexible support slidably supporting the upper run of said endless belt, said inflexible support being arranged to maintain the top surface of the forwardly moving upper run of the endless belt substantially in the common plane of the upper surfaces of said heating plates, and an upper endless belt extending forwardly from the rear edge of the rearmost heater plate and over the forwardly moving upper run of said lower endless belt, and means operable while the machine is running for varying the velocity of said upper endless belt.

4. In a machine of the character described, the combination with means for corrugating a web and applying continuous liner webs to opposite faces of said corrugated web, a series of heater plates over which the double-faced corrugated board is drawn, said heater plates being constructed and arranged to provide a substantially continuous flat support for the double-faced corrugated board, an endless belt arranged in advance of said heating plates and having its upper run moving forwardly away from said heater plates, a flat-surfaced plate arranged below and slidably supporting the upper run of said endless belt for maintaining the forwardly moving upper surface of the latter flat and substantially in the common plane of the upper surfaces of said heating plates, an upper endless belt extending forwardly from the rear edge of the rearmost heater plate to and beyond the front edge of said flat-surfaced plate, the lower run of said upper endless belt being arranged to press the double-faced corrugated board down onto said heater plates and the upper run of the first-mentioned endless belt, and means for varying the velocity of said upper endless belt while in motion.

5. In a machine of the character described, the combination with a pair of web-corrugating rolls geared together to rotate in unison, of means for supplying a continuous web to said corrugating rolls, means for applying upper and lower liner webs to the opposite sides of the corrugated web, means operating frictionally on the upper and lower surfaces of the double-faced corrugated board for feeding the completed double-faced corrugated board away from said web-corrugating rolls, a power shaft, constant speed ratio operating connections between said power shaft and said corrugating rolls, and a variable speed transmission connection between said power shaft and said frictional web-feeding means, said variable speed transmission connection being operable while the machine is running for regulating the tension under which the double-faced board is formed and dried.

6. In a machine of the character described, the combination with a pair of corrugating rolls geared together to rotate in unison, of means for supplying a continuous web to said corrugating rolls, means for applying liner webs to the opposite sides of the corrugated web, means including upper and lower belts frictionally engaging opposite surfaces of the double-faced corrugated board during a drying stage through which said double-faced corrugated board is passed, cutter mechanism constructed and arranged to operate on the completed double-faced corrugated board delivered thereto by said upper and lower friction belts, means for varying the operating speed of said upper and lower friction belts with respect to said corrugating rolls while the machine is running for regulating the tension in the double-faced board, and means for varying the periodicity of said cutter mechanism while it is running with a cutting speed equal to the velocity at which the double-faced corrugated board is delivered thereto by the upper and lower friction belts.

7. In a machine of the character described, the combination with web-corrugating rolls, of means for supplying a continuous web to said web-corrugating rolls, means for applying adhesive to the oppositely-presented tips of the corrugations in said continuous web, means for applying liner webs to the oppositely-presented tips of said corrugated web, a heating table provided with a substantially continuous flat top surface, a flat cooling plate extending forwardly from the forward edge of said heating table and below the plane of said flat top surface, a lower frictional feed belt having a forwardly traveling portion slidably supported by said cooling plate for maintaining its top surface substantially in a common plane with the top surface of said heating table section, an upper endless belt having its forwardly moving run arranged to press the double-faced corrugated board into slidable engagement with said heating table and cooperating with said lower frictional feed belt for feeding the double-faced corrugated board forwardly while at the same time maintaining a uniformly distributed pressure on said double-faced corrugated board throughout the drying operation.

8. In a machine of the character described, the combination with a pair of corrugating rolls geared together to rotate in unison, of means for supplying a continuous web to said corrugating rolls, means for applying upper and lower liner webs to the opposite sides of the corrugated web, upper and lower friction belts operating on the double-faced corrugated board, a heating table and a cooling plate extending in series below the upper friction belt, said cooling plate being arranged below the upper run of the lower friction belt for holding its upper surface in a common plane with the top surface of said heating table, a power shaft common to said corrugating rolls and said upper and lower friction belts, a constant speed operating connection between said power shaft and said corrugating rolls, and a variable speed operating connection between said power shaft and said friction feed belts and operable while the machine is running for regulating the tension of the double-faced board.

9. In a machine of the character described, the combination with a pair of corrugating rolls geared together to rotate in unison, of means for supplying a continuous web to said corrugating rolls, means for applying upper and lower liner webs to the opposite sides of the corrugated web, upper and lower friction feed belts operating on the continuous double-faced corrugated board, means for drying the continuous double-faced corrugated board, cutter mechanism constructed and arranged to operate on the completed double-faced corrugated board for cutting successive portions of equal length therefrom, a power shaft, a constant speed operating connection between said power shaft and said corrugating rolls, a variable speed operating connection between said power shaft and said friction feed belts, and a variable speed operating connection between said power shaft and said cutter mechanism, said variable speed operating connections being operable while the machine is running.

10. In a machine of the character described, the combination with upper and lower web-corrugating rolls constructed and arranged to operate upon a continuous web, of a pressure roll rotatable about an axis in the common axial plane of said corrugating rolls, said pressure roll being constructed and arranged to press a continuous liner web into engagement with the silicated tips of said corrugated web as it passes between it and the lower corrugating roll, an elongated support extending forwardly away from said pressure roll, said elongated support including a series of heating plates, an arcuate preheating table for the second liner web merging with the rear end of said elongated support, an upper friction belt operating on the completed double-faced corrugated board throughout the length of said elongated support, a lower friction belt cooperating with a portion of the upper friction belt on said completed double-faced corrugated board, a power shaft, a constant speed operating connection between said power shaft and said corrugating rolls, and a variable speed transmission for connecting said power shaft to said friction feed belts and operable while the machine is running for regulating the tension of the double-faced board.

11. In a machine of the character described, the combination with means for applying a liner web to the silicated tips of a corrugated web, of means for conveying the corrugated web with its applied liner web through successive heating and cooling stages of a drying operation, and power-driven operating connections for driving said conveying means, said power-driven operating connections including a variable speed transmission operable while the machine is running for changing the velocity of said conveying means.

12. In a machine of the character described, the combination with means for applying liner webs to the oppositely-presented silicated tips of a corrugated web, of upper and lower feeding belts constructed and arranged to operate on the assembled corrugated and liner webs of said double-faced corrugated board during a drying operation, and means including a variable speed transmission operable while the machine is running for driving said upper and lower feeding belts.

13. In a machine of the character described, the combination with web-corrugating rolls, of means for applying a liner web to the silicated tips of a corrugated web coming from said web-corrugating rolls, means for conveying the assembled webs through a drying operation, said conveying means including web-feeding means and positively geared operating connections for said web-feeding means, said positively geared operating connections including variable speed power-transmitting mechanism whereby the velocity of said web-feeding means may be adjusted relatively to the speed of said web-corrugating rolls.

14. In a machine of the character described, the combination with web-corrugating rolls, of means for applying a liner web to the silicated tips of a corrugated web coming from said web-corrugating rolls, means for heating and drying the assembled webs during their movement away from said web-corrugating rolls, frictional web-feeding means constructed and arranged to maintain the assembled webs taut between said web-corrugating rolls and said heating and drying means, and positively geared operating connections for driving said web-corrugating rolls and web-feeding means in timed relation, said operating connections including variable speed power-transmitting mechanisms connected to said web-feeding means for varying the tension in said assembled webs.

15. In a machine of the character described, the combination with web-corrugating rolls, of means for applying a liner web to the silicated tips of a corrugated web coming from said web-corrugating rolls, means for conveying the assembled webs through a drying operation, cutter mechanism constructed and arranged to operate on the assembled webs after the drying operation, said conveying means including web-feeding means constructed and arranged to feed the assembled webs to said cutter mechanism, and positively geared operating connections for driving said web-corrugating rolls, web-feeding means and cutter mechanism in timed relation, said operating connections including variable speed power-transmitting mechanisms connected to said cutter mechanism and web-feeding means respectively.

16. In a machine of the character described, the combination with web-corrugating rolls, of means for applying liner webs to the oppositely-presented silicated tips of a corrugated web coming from said web-corrugating rolls, frictional feed belts for conveying the assembled webs through a drying operation, a power shaft common to said web-corrugating rolls and said frictional feed belts, positively geared operating connections between said power shaft and said web-corrugating rolls, and a Reeves variable speed transmission interposed between said power shaft and said frictional feed belts.

17. In a machine of the character described, the combination with web-corrugating rolls, of means for applying liner webs to the oppositely-presented silicated tips of a corrugated web coming from said web-corrugating rolls, frictional feed belts for conveying the assembled webs through a drying operation, cutter mechanism constructed and arranged to operate on the assembled webs after the drying operation, said frictional feed belts being constructed and arranged to feed the dried assembled webs to said cutter mechanism, a power shaft connected to said web-corrugating rolls by constant speed gearing, variable speed gearing connecting said cutter mechanism to said power shaft, and variable speed gearing connecting said frictional feed belts to said power shaft.

18. In a machine of the character described, the combination with web-corrugating mechanism constructed and arranged to operate upon a continuous web, of a heating and drying table having its upper surface disposed in a horizontal plane, means for applying a continuous liner web to one face of the corrugated web as it leaves the web-corrugating mechanism and delivering the continuous single-faced corrugated board to said heating and drying table, an arcuate preheating table merging with the rear edge of said heating and drying table, means for unwinding a roll of the second liner web and delivering it to said arcuate preheating table, and upper and lower frictional feed belts operating on the completely assembled double faced corrugated board at a slight overfeed in respect to said web-corrugating mechanism for maintaining the single-faced corrugated board taut between said web-corrugating mechanism and said heating and drying table.

19. In a machine of the character described, the combination with web-corrugating rolls, of means for applying a liner web to one face of a continuous corrugated web coming from said web-corrugating rolls, a drying table extending away from said web-corrugating rolls, frictional feed belts constructed and arranged to move the completely assembled corrugated board over the drying table and, to maintain the single-faced corrugated board taut between the web-corrugating rolls and said drying table, a series of rolls constructed and arranged to operate frictionally on a second liner web at intermittent intervals determined by the tension in the said second liner web, a power shaft common to said web-corrugating rolls, said endless belts, and said series of liner web rolls, variable speed power-transmission means interposed between said power shaft and said endless belts, a constant speed operating connection between said power shaft and said web-corrugating rolls, and a constant speed operating connection between said power shaft and said series of rolls.

20. In a machine of the character described, the combination with web-corrugating rolls, of means for applying a liner web to the silicated tips on one face of said corrugated web, a heating table section provided with a substantially continuous flat top surface, a cooling table section provided with an endless belt substantially forming an extension to said heating table section, an arcuate preliminary heating table for the second liner web merging into said heating table section, an upper endless belt having its forwardly moving section extending above and cooperating with said heating and cooling table sections successively for feeding the double-faced corrugated board forwardly over the heating and cooling table sections, a power shaft common to said web-corrugating rolls and said endless belts, variable speed power-transmission means interposed between said power shaft and said endless belts, and a mill-roll unwinding roll geared to said common power shaft for delivering the second liner web to said arcuate preheating table, the last-mentioned roll being constructed and arranged to operate on the liner web at intermittent intervals by friction due to the tensioning of the liner web by said endless belts.

21. In a machine of the character described, the combination with mechanism for assembling a plurality of continuous webs and uniting said webs together to form a continuous composite web, of frictional feed belts constructed and arranged to operate on the top and bottom surfaces of the continuous composite web, and power-driven operating connections for said frictional feed belts including a variable speed transmission operable while the machine is running for varying the velocity of said frictional feed belts.

22. A machine of the character claimed in claim 21, in which means responsive to tension in one of the component webs is constructed and arranged to maintain said web under substantially constant tension while the machine is in operation.

23. A machine of the character claimed in claim 21, in which means responsive to tension in one of the component webs is constructed and arranged to maintain said web under substantially constant tension while the machine is in operation, and in which means for regulating web-tension is constructed and arranged to operate upon another one of the component webs.

24. In a corrugated paper board machine, the combination with a pair of cooperatively driven paper-corrugating rolls, of means for feeding a continuous web of paper to said corrugating rolls, means for applying liner webs to opposite faces of the corrugated web to form a continuous web of double-faced corrugated paper board, frictional feed belts operating on said continuous web of double-faced corrugated board at a linear speed in excess of the peripheral speed of said paper-corrugating rolls, a power-driven web-feeding roll arranged to operate upon one of said liner webs and having a peripheral speed in excess of the speed imparted to said continuous web of double-faced corrugated paper board by said frictional feed belts, means responsive to tension in said liner web for tightening it into feeding engagement with said web-feeding roll, and means operating on the other liner web prior to its attachment to the corrugated web for regulating the tension therein.

25. In a corrugated paper board machine, the combination with a pair of cooperatively driven paper-corrugating rolls, of web-feeding means constructed and arranged to be controlled by and to regulate the tension in a continuous web which is being supplied to said paper-corrugating rolls, means for applying a first liner web to one face of the corrugated web as it leaves one of the corrugating rolls, means for applying a second liner web to the other face of said corrugated web, a heating and drying table over which the assembled corrugated and liner webs are passed, means operating on the assembled webs for advancing said assembled webs and tensioning said liner webs, means operating on and under control of the tension in one of said liner webs for supplying it under substantially constant tension from a source of supply, and means for regulating the tension in the other liner web for maintaining said liner webs under substantially fixed relative tensions during their incorporation with the corrugated web to form the double-faced corrugated paper board.

26. In a corrugated paper board machine, the combination with a pair of cooperatively driven paper-corrugating rolls, of web-feeding means constructed and arranged to be controlled by and to regulate the tension in a continuous web which is being supplied to said paper-corrugating rolls, means for applying a first lined web to one face of the corrugated web as it leaves one of the corrugating rolls, means for applying a second liner web to the other face of said corrugated web, a heating and drying table over which the assembled corrugated and liner webs are passed, frictional feed belts operating on the assembled webs as they move over said heating and drying table, a frictional web-feeding roll arranged to operate on and under the control of tension in said second liner web for feeding it under substantially constant tension to said frictional feed belts, and means operating on said first liner web for varying the tension therein with respect to the second liner web.

27. In a corrugated paper board machine, the combination with a pair of cooperatively driven paper-corrugating rolls, of frictional web-feeding means constructed and arranged to be controlled by and to regulate the tension in a continuous web which is being supplied to said paper-corrugating rolls, means for applying a first liner web to one face of the corrugated web as it leaves one of the corrugating rolls, means for applying a second liner web to the other face of said corrugated web, a heating and drying table over which the assembled corrugated and liner webs are passed, upper and lower frictional feed belts operating on the assembled webs as they move over said heating and drying table, operating connections including a variable speed power transmission for driving said frictional feed belts at a variable linear speed, a frictional web-feeding roll arranged to operate at constant peripheral velocity on and under the control of tension in said second liner web, and means for varying the drag on said first liner web for regulating the relative tensions in said liner webs.

28. In a corrugated paper board machine, the combination with a pair of cooperatively driven constant speed paper-corrugating rolls, of frictional web-feeding means constructed and arranged to be controlled by and to regulate the tension in a continuous web which is being supplied to said paper-corrugating rolls, means for applying a first liner web to one face of the corrugated web as it leaves one of the corrugating rolls, means for applying a second liner web to the other face of said corrugated web at a distance from the said one of the corrugating rolls, a heating and drying table over which the assembled corrugated and liner webs are passed, upper and lower frictional feed belts operating on the assembled webs as they move over said heating and drying table, means for driving said corrugating rolls at constant velocity, means for driving said frictional feed belts at a variable linear speed in excess of the peripheral velocity of said corrugating rolls, a frictional web-feeding roll arranged to operate on said second liner web, means for driving said frictional web-feeding roll at constant speed in excess of the peripheral speed of said corrugating rolls, and means under control of the tension in said second liner web for moving it into and out of web-feeding engagement with said web-feeding roll.

29. In a corrugated paper board machine, the combination with a pair of cooperatively driven constant speed paper-corrugating rolls, of frictional web-feeding means constructed and arranged to be controlled by and to regulate the tension in a continuous web which is being supplied to said paper-corrugating rolls, means for applying a first liner web to one face of the corrugated web as it leaves one of the corrugating rolls, means for applying a second liner web to the other face of said corrugated web at a distance from the said one of the corrugating rolls, a heating and drying table over which the assembled corrugated and liner webs are passed, upper and lower frictional feed belts operating on the assembled webs as they move over said heating and drying table, a constant speed power shaft with constant speed gearing connections with said corrugating rolls, a variable speed transmission connection between said power shaft and said frictional feed belts whereby the latter may be driven at a variable linear speed in excess of the peripheral velocity of said corrugating rolls, a frictional web-feeding roll arranged to operate on said second liner web and having a constant overspeed connection with said power shaft in respect to the normal speed of the second liner web, and tension-regulating means operating on said first liner web for maintaining it under fixed relative tension with respect to the second liner web.

30. In a machine of the character described, the combination with means for forming a continuous composite web of separate webs which are secured together by adhesive, of a series of heater plates having their top surfaces arranged in a common plane and forming a substantially continuous flat support, a lower endless belt having a forwardly moving portion extending away from said heating plates, an inflexible flat plate extending below and in continuous slidable engagement with the upper run of said lower endless belt for maintaining its top surface in the common plane of the substantially continuous flat support formed by the upper surfaces of said heating plates, an upper endless belt having its lower run arranged to press the continuous composite web into successive engagement with said heater plates and the upper run of said lower endless belt, and operating connections including a variable speed power transmission common to said upper and lower endless belts and operable while the machine is running.

31. In a machine of the character described, the combination with frictional web-feeding means operating on a complete assembly of webs moving at substantially constant velocity in a given plane during an extended heating and drying stage, said frictional web-feeding means having a velocity slightly in excess of said constant velocity of the web assembly, mechanism for unwinding a mill roll composed of one of said webs prior to its incorporation in the web assembly and for delivering it into position to be incorporated in said web assembly, said mill roll unwinding mechanism including a plurality of peripherally spaced power-driven web-feeding rolls having a peripheral velocity slightly in excess of said constant velocity of the web assembly, said web-feeding rolls being constructed and arranged to frictionally engage said web under a predetermined tension in the web for withdrawing an additional supply of web from the mill roll and thereby maintaining said web under a substantially constant tension during its movement from said web-feeding rolls into position to be incorporated in the web assembly.

32. In a corrugated paper board machine, the combination with upper and lower frictional feed belts operating on a continuous web of double-faced corrugated paper board at variable overspeed linear velocity with respect to the substantially constant velocity at which said continuous web is supplied thereto under tension, mechanism for unwinding the last applied liner web from a mill roll and feeding it to the single-faced corrugated web for completing the assembly of webs composing said continuous web of double-faced corrugated paper board, said mill roll unwinding mechanism including a plurality of peripherally spaced web-feeding rolls constructed and arranged to engage in alternation the opposite surfaces of said last applied liner web, and means for continuously driving said web-feeding rolls at a constant velocity slightly in excess of said constant velocity of the double-faced corrugated paper board, the last applied liner web being drawn into frictional web-feeding contact with said web-feeding rolls at recurring intervals by the forward movement of the double-faced corrugated board for maintaining said last applied liner web under substantially constant tension during its application to the single-faced corrugated paper web.

33. In a corrugated paper board machine, the combination with a mill roll of continuous liner web, of upper and lower frictional feed belts arranged to operate in a given plane upon the assembled webs of a continuous web of double-faced corrugated board including said liner web, a plurality of peripherally-spaced web-feeding rolls of equal diameter rotatable about axes arranged in a common plane parallelly spaced from the plane of action of said frictional feed belts, an arcuate heating table extending between said planes in advance of said web-feeding rolls, a common power shaft for said frictional feed belts and said web-feeding rolls, a variable speed transmission interposed between said common power shaft and said frictional feed belts, and power connections between said common power shaft and said web-feeding rolls for driving the latter with a peripheral velocity in excess of the normal speed of said liner web, said web-feeding rolls having constant arcs of contact with the continuous liner web alternately above and below the common axial plane of said web-feeding rolls, and a guide roller at the lower end of said arcuate heating table for guiding the continuous web thereto.

GEORGE W. SWIFT, Jr.